UNITED STATES PATENT OFFICE.

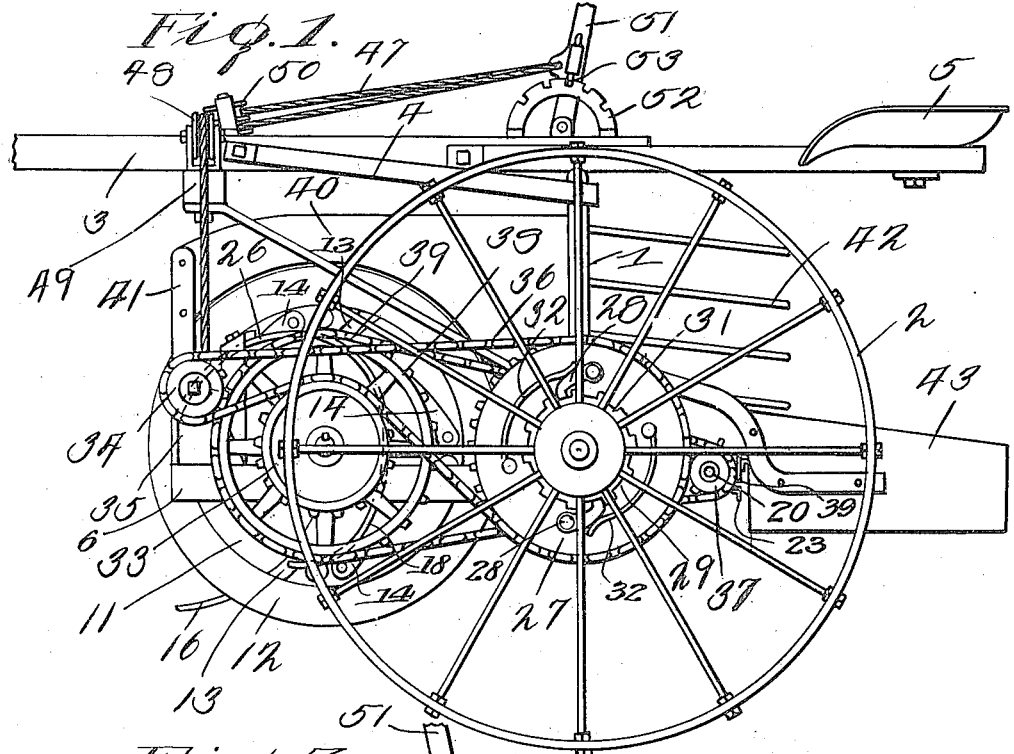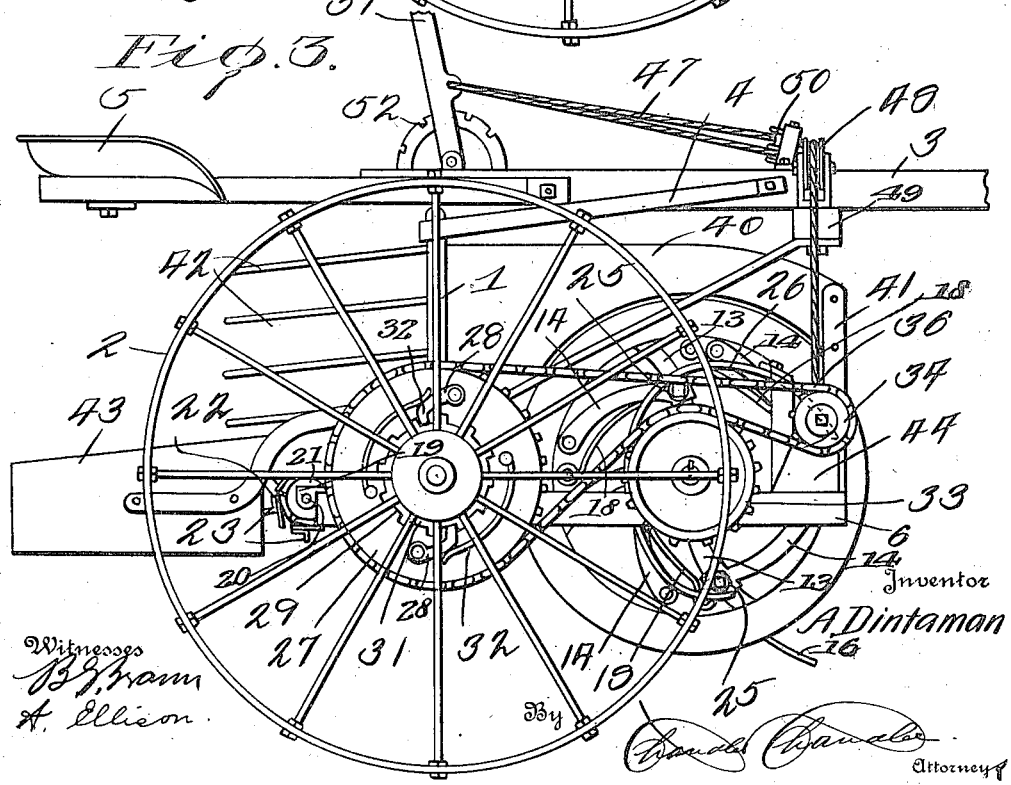

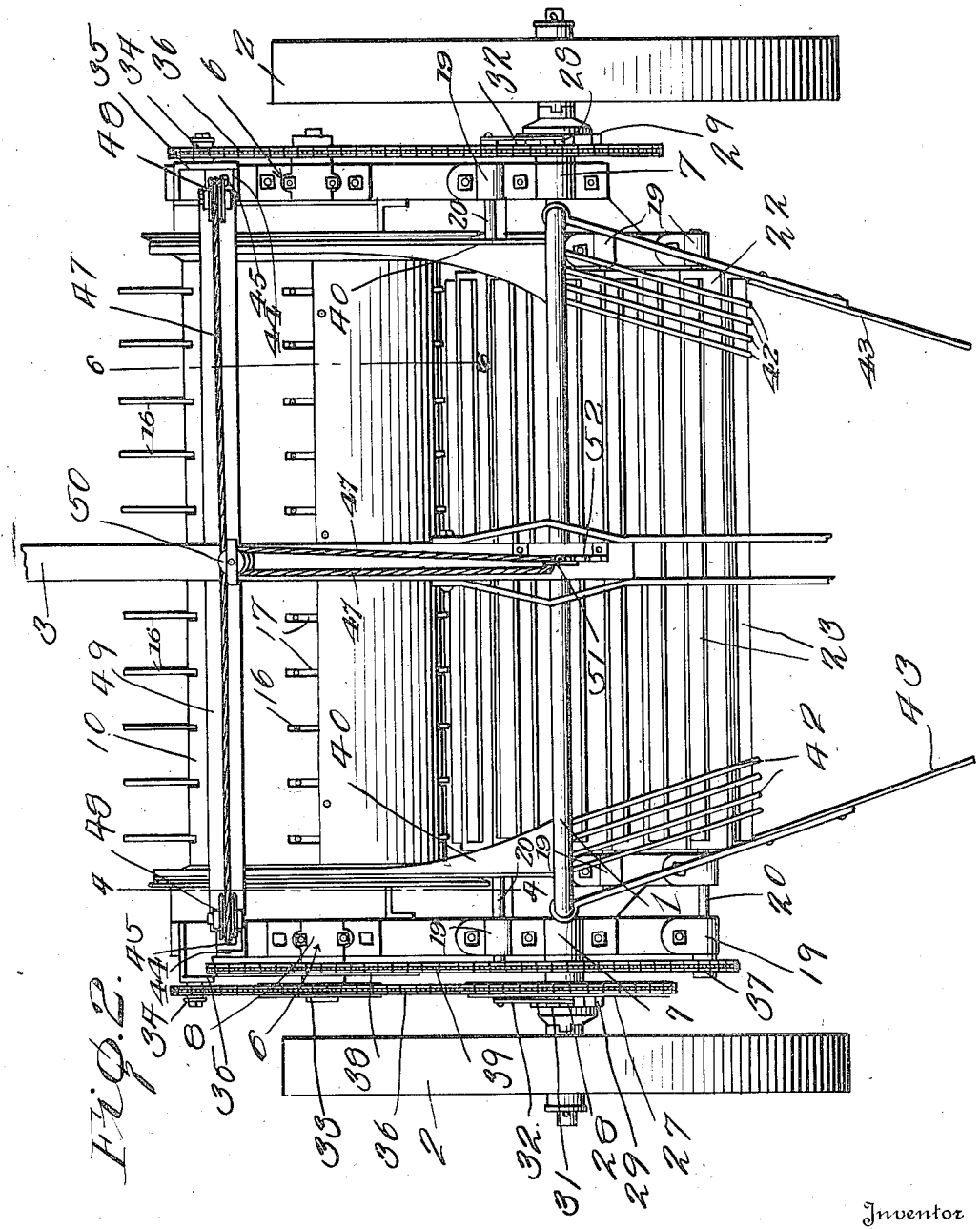

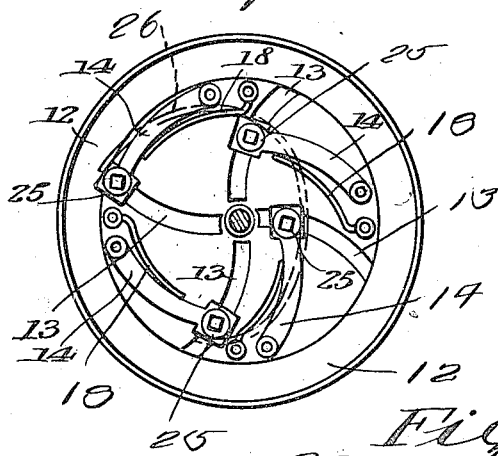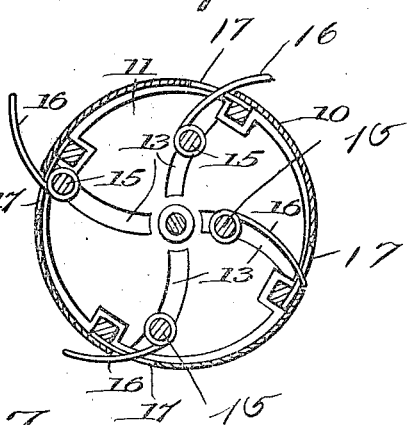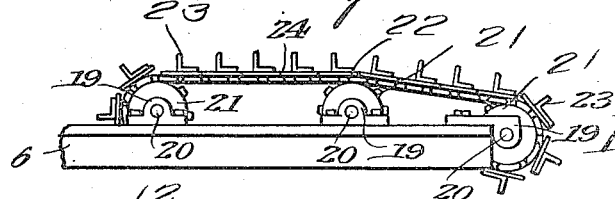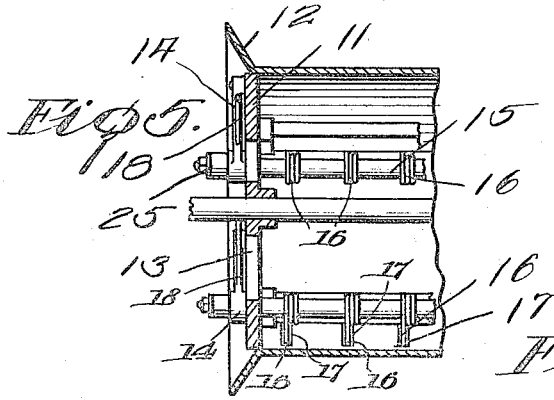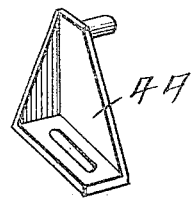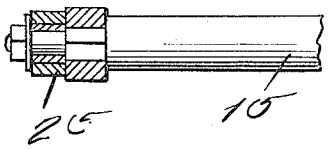

ABEL DINTAMAN, OF ALTO, MICHIGAN.

BEAN AND PEA LIFTER AND CLEANER.

1,170,616.  Specification of Letters Patent.  Patented Feb. 8, 1916.

Application filed August 25, 1914. Serial No. 858,556.

*To all whom it may concern:*

Be it known that I, ABEL DINTAMAN, a citizen of the United States, residing at Alto, in the county of Kent, State of Michigan, have invented certain new and useful Improvements in Bean and Pea Lifters and Cleaners; and I do hereby declare the following to be a full, clear, and exact description of the invention, such as will enable others skilled in the art to which it appertains to make and use the same.

This invention relates to a bean and pea lifter and cleaner.

An object of the invention is to provide a machine of this character by means of which several rows of bean or pea vines which have been previously pulled from the ground may be lifted therefrom, and agitated so as to remove the earth from the roots thereof, and then deposited in one row.

A further object of the invention is to so construct the lifting drum that the same may be readily adjusted so as to be either in an operative or inoperative position.

A still further object of the invention is to provide means on the machine to engage the vine during the lifting operation and which means automatically deposits the vine onto the shaking mechanism.

With these and other objects in view, such as will appear as the description progresses, my invention comprises the combination and arrangement of parts as herein set forth and subsequently claimed.

Referring to the drawing: Figure 1 is a side elevation of the device. Fig. 2 is a plan elevation thereof. Fig. 3 is a side elevation of the device looking from the opposite side to that of Fig. 1. Fig. 4 is a section on line 4—4 of Fig. 2, showing the end of the lifting drum, certain parts being omitted to avoid confusion. Fig. 5 is a fragmental sectional view of the drum member. Fig. 6 is a section on line 6—6 of Fig. 2. Fig. 7 is a fragmental view, showing the manner of mounting and operating the shaker. Fig. 8 is a fragmental sectional view of one of the shafts which carries the lifting fingers, showing the manner in which it is mounted and also the fingers thereon. Fig. 9 is a fragmental detail, showing the chain tightener.

Referring to the drawing wherein like parts are indicated by like characters throughout the several views: My device comprises a U-shaped axle 1 on which is revolubly mounted a pair of whels 2. Secured to the bight portion of this axle and extending at right angles thereto is a draft tongue 3 which is suitably braced by braces 4 and to which is connected a seat 5 for the operator, the said seat extending rearwardly of the said tongue.

Pivotally secured on the axle adjacent each of the wheels is a forwardly extending metallic strip 6 which forms a support for the lifting drums and cleaner mechanism. Upon the upper faces of these members 6 are bearings 7 by means of which the said strips are pivotally supported on the axle. Mounted in bearings 8 adjacent the forward ends of these strips 6 is fixedly secured a drum 10. This drum is of elongated cylindrical formation and has closed ends 11 and projecting flanges 12.

In order that the bean or pea plants may be readily lifted from the ground, I have constructed the end 11 of the drum 10 with radially extending arcuate slots 13 and pivotally mounted between the said slots adjacent the periphery of the end plate curved arms 14, the ends of which arms terminate in alinement with the slots 13. Mounted on the ends of these arms 14 and extending between the arms on one end thereof and the arms on the other end are shafts 15 which have secured thereon in spaced relation fingers 16, which fingers are adapted to extend through alined slots 17 in the cylindrical portion of the said drum and are adapted to be drawn within the drum through the said slots during the operation of the machine. The arms 14 are normally pressed outwardly so as to cause the fingers 16 to extend through the slots 17 by leaf springs 18 mounted on the end 11.

The strips 6 extend rearwardly of the axle 1 and have revolubly mounted, in bearings 19, transversely extending shafts 20 which have sprocket wheels 21 over which chains 22 are adapted to move. Secured to the links of these chains 22 and extending parallel to the shafts 20 are strips 23 which form an endless cleaner. The extreme forward portion of this endless cleaner terminates adjacent the periphery of the drum 10 so that bean or pea vines are lifted by the said drum and may be readily deposited upon the said cleaner.

It will be obvious that as the vines are deposited upon the cleaner the dirt will be knocked therefrom to some extent and the dirt will be further freed because of the movement of the cleaner with relation to the picking drum. Thus when the vines are thrown from the cleaner they will be separated from the dirt.

In order that the vines may be engaged by the fingers 16 while the said vines are lying upon the ground and thereafter lifted to a position above the fingers and finally deposited upon the said cleaner, I have provided the following mechanism: On the end of each of the shafts 15 is a roller 25 which is adapted to contact with an arcuate cam track 26, the said cam track being mounted on the supporting strips 6 adjacent the bearing 8. The construction at the other end of the drum 10 is of course similar. As the drum 10 revolves the rollers 25 on the shafts 15 successively engage the cam tracks 26 on their upward movement. When one of the shafts 15 is adjacent the ground, the fingers 16 thereon extend out of the slots 17 and the rollers 25 on the ends thereof are disengaged from the tracks 26. In this position the fingers 16 engage the vine and lift the same.

As the vehicle advances and the drum is revolved, the rollers 25 on the aforementioned shafts 15 engage the cam tracks 26 so that the said fingers 16 thereon are gradually thrown into the drum 10 until when they reach a position adjacent the forward end of the cleaner 24 they are entirely within the said drum and the vines are thrown from the said drum onto the cleaner. Each successive shaft 15 has a similar motion. It is to be understood that when the rollers 25 are not in engagement with the cam tracks 26 the leaf springs 18 press the arms 14 toward the periphery of the ends 11 and extend the fingers 16 from the adjacent slots 17 in the drum.

In order that the drum 10 may be rotated during the advance of the machine, I have provided on each end of the axle 1 a sprocket wheel 27 which is loosely mounted thereon and which may be clutched to the adjacent wheel 2 by spring pressed pawls 28 mounted on the said sprocket wheel 27 and normally held in engagement with slots 29 in an enlargement 31 on the adjacent wheel by springs 32. The tendency of these springs is to maintain the pawls in engagement with the slots, but the springs may be disengaged from the said pawls to allow the wheels to revolve free of the drum. This may be accomplished by manually lifting the springs 32, swinging the pawls 28 about their pivots until they are disengaged from the springs and wheels 31 and then freeing the springs.

Fixed on each end of the shaft 9 of the drum 10 is a sprocket wheel 33 and adjacent this sprocket wheel is a chain tightener 34 which is adjustably mounted on a supporting arm 35. A driving chain 36 passes over each of the sprockets 27 and around the chain tightener 34 and thence over the sprocket 33 so that during the movement of the chain 36 the said sprocket 33 together with the drum to which it is fixed is rotated.

In order that the cleaner 24 may be rotated simultaneously with the drum 10, I have provided the rearmost shaft 20 with an extended end on which is fixedly secured a sprocket wheel 37 and on one end of the drum shaft a sprocket wheel 38. A driving chain 39 passes over the sprocket wheel 38 and thence over the sprocket wheel 37 so that during the rotation of the drum 10 the said sprocket wheel 37 together with the shaft 20 on which it is mounted is rotated and consequently the endless cleaner is rotated.

In order that the vines may be guided toward the middle of the cleaner 24 as they move rearwardly, I have provided two guide members 40 which are secured to the supporting strips 6 by arms 41 and have on the rear edges thereof fingers 42 which converge rearwardly over the cleaner 24 and have a space between the rearmost ends thereof through which the vines are discharged. An additional pair of guide members 43 are provided, the same being secured to the axle 1 and extending rearwardly and converging but projecting below and to the rear of the cleaner 24 so that after the vines drop from the said shaker, they will be deposited upon the ground as the vehicle moves forwardly in a narrow row.

During the advance of the vehicle, the drum 10 is held in contact with the ground by gravity so that it rides upon the flanges 12 and it may be readily seen that it is at some times desirable not only to lift the drum entirely from the ground, but to regulate the distance of the same from the ground. To this end I have provided on the front end of the supporting strips 6 angle irons 44. Attached to each of these angle irons 44 is a cable or other flexible member 47 which extends upwardly over pulleys 48 on a cross beam 49, the latter being secured to the tongue 3. The cables 47 then pass over pulleys 50 and are attached to a lever 51 which is pivotally mounted on the tongue 3 in front of the operator's seat 5 and is adjustable on a quadrant 52 and held in its adjusted position by means of a spring pressed pawl 53.

From the foregoing description it may be readily seen that I have provided a machine for lifting bean and pea vines from the ground from several rows at a time and cleaning the dirt from the same and depositing them in the rear of the machine during the advance through a field.

I have provided the raising drum with fingers which during the revolution of the drum project therefrom so as to engage the vines and raise them to a position over the cleaner at which time they retreat within the drum and cast the vines therefrom onto the said cleaner.

While I have illustrated and described a particular embodiment of my invention, I wish it to be understood that I do not wish to be limited to that particular embodiment of my invention for it is obvious that numerous changes may be made within the scope of the invention as defined by the claims.

What is claimed is:

1. In a machine of the class described, a revolubly mounted drum, means for supporting the same, the said drum having radially extending arcuate slots in the end thereof, and spaced slots on the periphery thereof, longitudinally extending shafts within the said drum having the ends thereof extending through the arcuate slots, fingers on the said shafts adapted to extend through the peripheral slots, arms pivotally mounted on the said ends adjacent the arcuate slots and connected to the adjacent ends of the aforementioned shafts, resilient means for maintaining the free ends of the arms adjacent the periphery of the drum, and means adapted to move the said ends of the arms inwardly against the tension of the resilient means.

2. In a vine lifting machine, an axle, supporting wheels revolubly mounted thereon, supporting strips pivotally mounted on said axle and extending forwardly and rearwardly therefrom, a transversely extending shaft revolubly mounted on the forward portions of said supporting strips and extending between the same, a cylindrical drum fixedly mounted on said shaft, the ends of the said drum having radially extending arcuate slots therein, and the body of the said drum having peripheral slots in spaced relation, arms pivotally mounted on the ends of the drum, the said shaft being fixedly connected to the ends of said arms and movable in the arcuate slots, fingers on the said shafts adapted to extend through the peripheral slots, rollers on the ends of said shafts, cam tracks secured to said supporting strips and adapted to engage the rollers, and resilient means for maintaining the said rollers in engagement with the said cam tracks.

3. In a vine lifting machine, a drum, means for supporting the same, means for rotating the same, the said drum being cylindrical in formation and having spaced slots in the body portion thereof, fingers mounted within the drum and adapted to extend through said slots, resilient means for normally maintaining the fingers in their extended positions, and means for withdrawing the fingers through the said slots.

In testimony whereof I affix my signature, in the presence of two witnesses.

ABEL DINTAMAN.

Witnesses:
　E. NASH,
　ROY S. BLOOGH.